(12) United States Patent
Adachi

(10) Patent No.: US 10,306,572 B2
(45) Date of Patent: May 28, 2019

(54) COMMUNICATION DEVICE AND COMMUNICATION METHOD

(71) Applicant: Kabushiki Kaisha Toshiba, Minato-ku (JP)

(72) Inventor: Tomoko Adachi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 181 days.

(21) Appl. No.: 15/391,266

(22) Filed: Dec. 27, 2016

(65) Prior Publication Data

US 2017/0273039 A1 Sep. 21, 2017

(51) Int. Cl.
| | |
|---|---|
| *G08G 1/07* | (2006.01) |
| *H04J 3/06* | (2006.01) |
| *H04L 7/00* | (2006.01) |
| *G08G 1/095* | (2006.01) |
| *H04L 29/06* | (2006.01) |

(Continued)

(52) U.S. Cl.
CPC ............ *H04W 56/001* (2013.01); *G08G 1/07* (2013.01); *G08G 1/096716* (2013.01); *G08G 1/096758* (2013.01); *G08G 1/096783* (2013.01); *H04J 3/0658* (2013.01); *H04L 7/0016* (2013.01); *H04L 69/28* (2013.01); *H04W 4/04* (2013.01); *G08G 1/095* (2013.01); *H04J 3/0697* (2013.01);

(Continued)

(58) Field of Classification Search
CPC ........ H04W 56/001; H04W 4/04; G08G 1/07; G08G 1/096716; G08G 1/096758; G08G 1/096783; H04J 3/0658; H04L 7/0016; H04L 69/28

USPC ......................................................... 370/350
See application file for complete search history.

(56) References Cited

U.S. PATENT DOCUMENTS 9,577,898 B1 * 2/2017 Baldi .................... H04L 43/062
9,942,455 B2 * 4/2018 Hansen .................. G06Q 50/10
(Continued)

FOREIGN PATENT DOCUMENTS

| JP | 5246409 | 7/2013 |
|---|---|---|
| JP | 2013-258467 | 12/2013 |

(Continued)

OTHER PUBLICATIONS

I Iglesias, et al., "I2V communication driving assistance system: On-board Traffic Light Assistant", 2008, IEEE, pp. 1-5.

*Primary Examiner* — Christopher R Crompton
(74) *Attorney, Agent, or Firm* — Oblon, McClelland, Maier & Neustadt, L.L.P.

(57) ABSTRACT

A mobile communication device according to one embodiment includes a receiver, an imager, a detector, a determiner. The receiver configured to receive a frame including a first timing, a second timing, and first position information. The imager configured to capture the imaging target for a plurality of times. The detector configured to detect second position information, and third position information. The determiner determines whether or not the frame received by the receiver is a frame transmitted in tandem with an operation performed by the imaging target based on first to fourth timings. The corrector, when the determiner configured to determine that the frame received by the receiver is a frame transmitted in tandem with an operation performed by the imaging target, correct a timing of the clock based on the first to third position information and the first to fourth timings.

16 Claims, 9 Drawing Sheets

(51) Int. Cl.
  *H04W 56/00*   (2009.01)
  *H04W 74/08*   (2009.01)
  *H04W 84/00*   (2009.01)
  *H04W 84/12*   (2009.01)
  *G08G 1/0967*  (2006.01)
  *H04W 4/04*    (2009.01)

(52) U.S. Cl.
  CPC ...... *H04W 74/0816* (2013.01); *H04W 84/005* (2013.01); *H04W 84/12* (2013.01)

(56) References Cited

U.S. PATENT DOCUMENTS

| | | | |
|---|---|---|---|
| 2012/0147192 A1* | 6/2012 | Wright | H04N 7/185 348/159 |
| 2013/0276129 A1* | 10/2013 | Nelson | H04N 21/23418 726/26 |
| 2015/0154452 A1* | 6/2015 | Bentley | G06K 9/00711 386/201 |
| 2015/0160935 A1* | 6/2015 | Nye | H04L 41/0806 717/178 |
| 2015/0263966 A1* | 9/2015 | Blake | H04L 47/28 370/229 |

FOREIGN PATENT DOCUMENTS

| | | |
|---|---|---|
| JP | 5382576 | 1/2014 |
| JP | 2014-23090 | 2/2014 |
| JP | 5527375 | 6/2014 |
| JP | 2015-164302 | 9/2015 |

* cited by examiner

| ELEMENT ID | LENGTH | CHANGE INFO | CHANGE TIME | LOCATION |
|---|---|---|---|---|

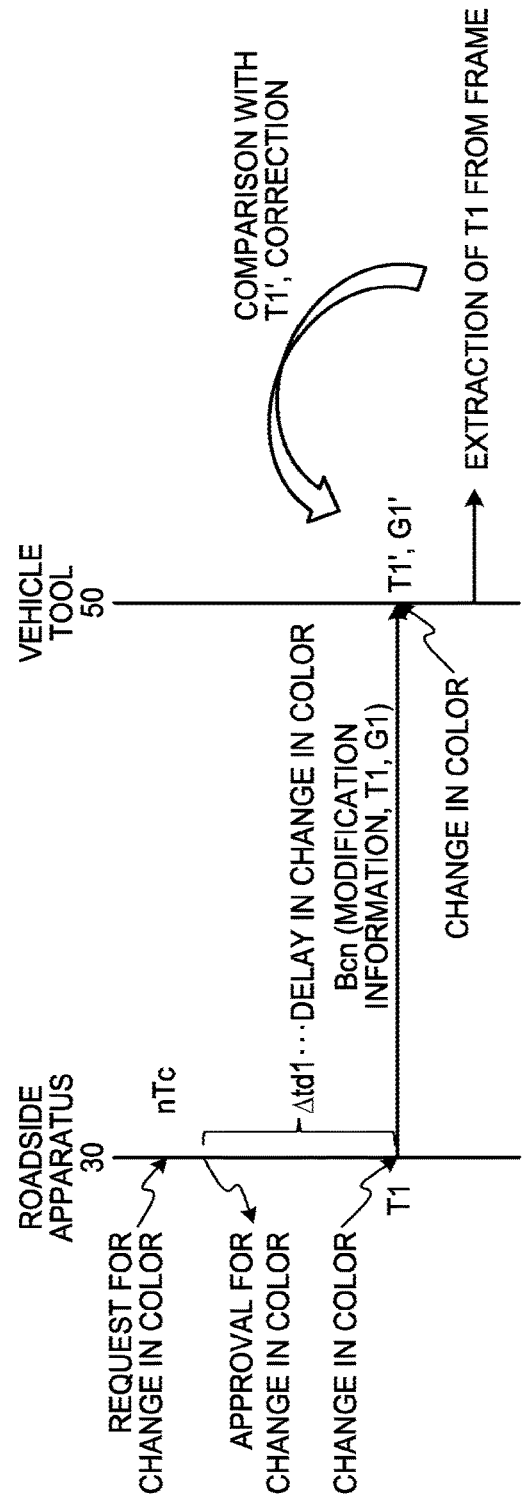

COMMUNICATION DEVICE AND COMMUNICATION METHOD

CROSS-REFERENCE TO RELATED APPLICATIONS

This application is based upon and claims the benefit of priority from Japanese Patent Application No. 2016-052982, filed on Mar. 16, 2016; the entire contents of which are incorporated herein by reference.

FIELD

An embodiment described herein relates generally to a communication device and a communication method.

BACKGROUND

Typically, in the intelligent transport system (ITS), a mobile communication device (a vehicle communication apparatus) performs communication with placed communication devices (roadside apparatuses) or with other mobile communication devices according as the situation demands. A method is being considered by which a mobile communication device receives a synchronization signal from a roadside apparatus upon entering the corresponding roadside apparatus area, and corrects its own synchronization signal.

However, in the past, the reliability of the synchronization signal transmitted by a placed communication device could not be determined by a mobile communication device.

BRIEF DESCRIPTION OF THE DRAWINGS

FIG. 8 is a diagram illustrating the relationship between information used in determination and correction performed in the mobile communication device;

DETAILED DESCRIPTION

A communication device according to one embodiment includes a receiver, an imager, a detector, a determiner. The receiver configured to receive a frame including a first timing, a second timing, and first position information. The first timing that indicates timing at which an imaging target performs operation in such a way that there is a difference among taken images taken for a plurality of times. The second timing that indicates timing at which the first timing becomes transmittable. The first position information that indicates a position of installation of the imaging target. The imager configured to capture the imaging target for a plurality of times. The detector configured to detect second position information, and third position information. The second position information that indicates a position of the imager when the imager captures the imaging target which performs operation in such a way that there is a difference among the taken images. The third position information that indicates a position of the imager when the receiver receives the frame. The determiner configured to determine whether or not the frame received by the receiver is a frame transmitted in tandem with an operation performed by the imaging target based on first to fourth timings. The third timing that indicates a timing at which the imager captures the imaging target which performs operation in such a way that there is a difference among taken images. The fourth timing that indicates a timing at which the receiver receives the frame. The corrector configured to, when the determiner determines that the frame received by the receiver is a frame transmitted in tandem with an operation performed by the imaging target, correct a timing of the clock based on the first to third position information and the first to fourth timings.

Figure 1:
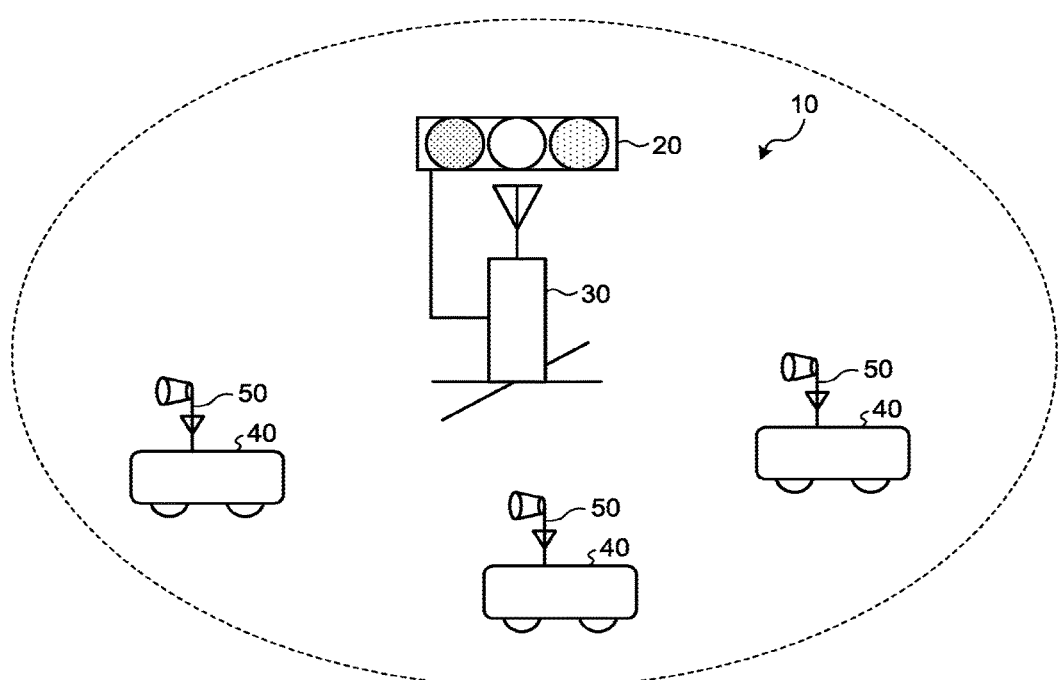
FIG. 1 is a diagram illustrating an overview of a communication system according to an embodiment.

An exemplary embodiment of a communication system 10 is described below with reference to the accompanying drawings. FIG. 1 is a diagram illustrating an overview of the communication system 10 according to the embodiment. As illustrated in FIG. 1, in the communication system 10, around a roadside communication device (a roadside apparatus) 30 that is installed in a communicable manner with a traffic light 20 on a public street, a plurality of vehicles (movers) 40 each having a mobile communication device (a vehicle tool) 50 installed therein are present in a passable manner.

The roadside communication device 30 is installed at a predetermined position on the roadside, and transmits wireless signals in response to the timings of changes in the color of the traffic light 20. Herein, the traffic light 20 is the imaging target of an imaging unit 58 described later. Alternatively, the traffic light 20 can be configured to change the color of the light in tune with the timings at which the roadside communication device 30 transmits the wireless signals. The roadside communication device 30 either can receive the timing of a change in the color of the traffic light 20 from the traffic light 20, or can obtain the timing of a change in the color of the traffic light 20 from the images taken using a digital camera or the like.

The wireless signals transmitted by the roadside communication device 30 are used to notify synchronization information. For example, in the IEEE802.11 wireless LAN, the value of the timestamp field corresponds to the synchronization information.

In the IEEE802.11 wireless LAN illustrated in FIG. 1, the roadside communication device 30 functions as an access point (AP) and the mobile communication devices 50 function as stations (STAs), and thus a group (a basic service set: BSS) for performing wireless communication is configured. Meanwhile, an AP is sometimes called a base station, while an STA is sometimes called a terminal. Moreover, in the IEEE802.11 wireless LAN, an AP is treated as a form of a STA. In the case of explicitly expressing an STA not functioning as an AP, it is distinguished as a non-AP STA.

When a BSS is configured centering on an AP (i.e., when an infrastructure BSS is configured), the AP carries the timer value of the timing synchronization function (TSF), which is provided therein, in the timestamp field and transmits a frame including the timestamp field to the STAs affiliated thereto. That is, the roadside communication device 30 is equipped with the functions of an AP, while the mobile communication device 50 is equipped with the functions of an STA. Herein, the TSF timer value can also be rephrased as the clock value.

An STA affiliated to an AP or an STA attempting to establish a connection with an AP obtains the value in the timestamp field, rerecords the TSF timer value held therein with the obtained value by the STA, and resultantly achieves synchronization with the AP. The frame that the AP transmits after inserting the timestamp field in that frame is, for example, a beacon frame.

In an AP of a normal wireless LAN, a beacon frame is transmitted based on the beacon interval. Still, in the case in which a beacon frame is actually transmitted to a wireless medium (air), it is transmitted based on Carrier Sense Multiple Access with Collision Avoidance (CSMA/CA)).

Meanwhile, the communication performed herein can be performed using management frame other than beacon frames. For example, in a wireless LAN, in order for an STA to obtain BSS information, the STA transmits a probe request frame; and the AP that receives the probe request frame transmits a probe response frame to that STA. Since the timestamp field can be inserted in a probe response frame too, it becomes possible to use a probe response frame. Besides, apart from a beacon frame or a probe response frame, for example, a management frame of a new type can be defined and the roadside communication device 30 can be configured to notify about the TSF time value.

The following explanation is given with the focus on the transmission of beacon frames. The transmission of beacon frames is dependent on the beacon interval as described above. However, regarding probe response frames or other management frames, except for such a restriction on the transmission, the operations are performed in an identical manner.

Figure 2:
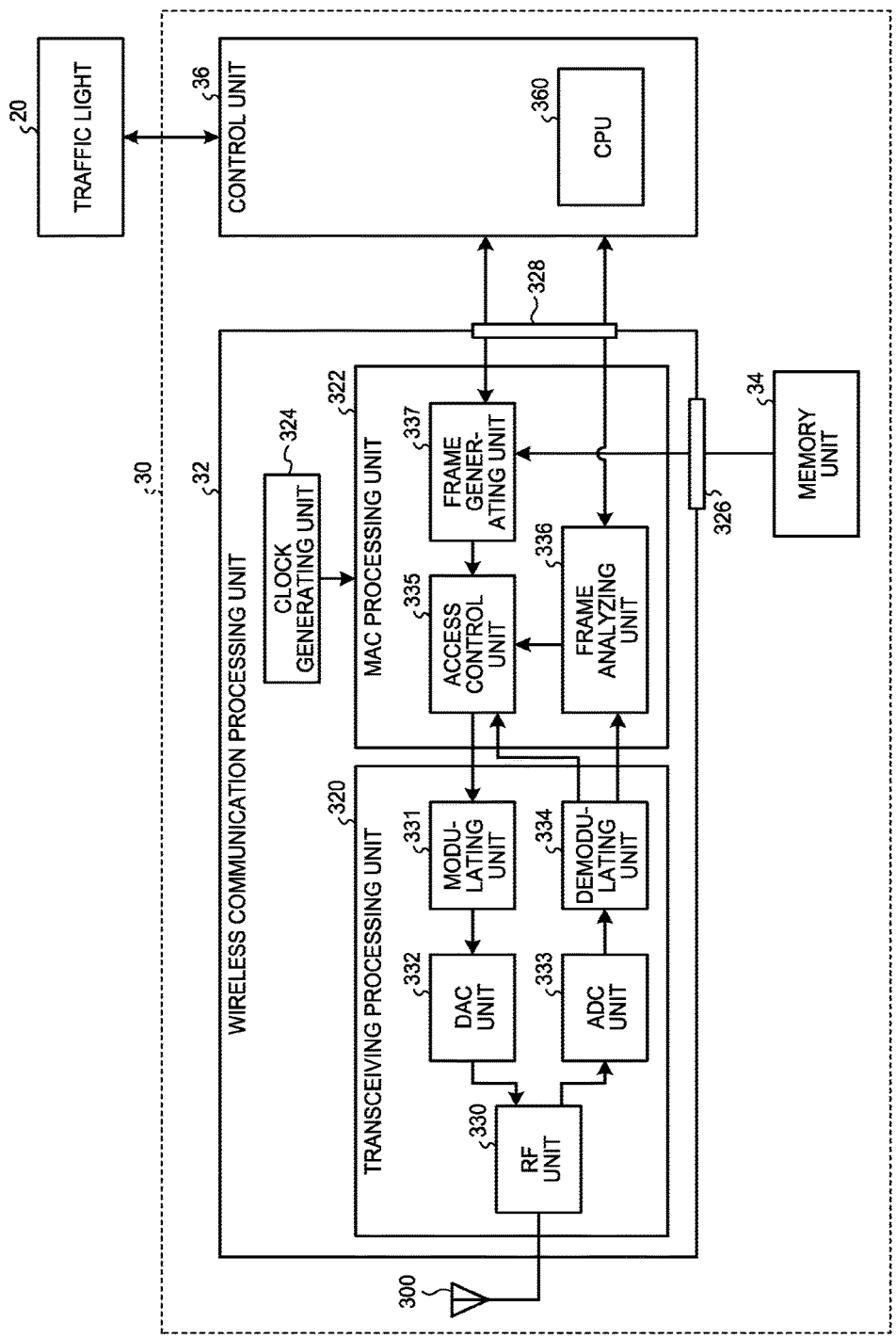
FIG. 2 is a block diagram illustrating an exemplary configuration of a roadside communication device and its surroundings according to the embodiment.

FIG. 2 is a block diagram illustrating an exemplary configuration of the roadside communication device 30 and its surroundings. As illustrated in FIG. 2, the roadside communication device 30 includes an antenna 300, a wireless communication processing unit 32, a memory unit 34, and a control unit 36. Moreover, the roadside communication device 30 is configured to be communicable with the traffic light 20, and is configured to be able to perform wireless communication with the mobile communication device 50 based on the IEEE 802.11 standard. The antenna 300 transmits and receives analog wireless signals in such as the 2.4 GHz band or the 5 GHz band.

The wireless communication processing unit 32 includes a transceiving processing unit 320, a Media Access Control (MAC) processing unit 322, and a clock generating unit 324. Moreover, the wireless communication processing unit 32 is connected to the memory unit 34 via an interface (I/F) 326, and is connected to the control unit 36 via an interface (I/F) 328.

The transceiving processing unit 320 includes, for example, a radio frequency (RF) unit 330, a modulating unit 331, a digital-to-analog conversion (DAC) unit 332, an analog-to-digital conversion (ADC) unit 333, and a demodulating unit 334. The RF unit 330 is a radio frequency integrated circuit including a switch, a low noise amplifier, a phase-locked loop (PLL), a mixed circuit, a low pass filter, and a power amplifier; and, using the antenna 300, switches between transmission and reception of frames having high-frequency waves serving as carrier waves. Thus, the wireless communication processing unit 32 has the function of a transmitter that transmits frames, which are generated by a frame generating unit(generator) 337 described later, via the antenna 300; as well as has the function of a receiver that receives frames via the antenna 300.

The received signals that are received by the antenna 300 are subjected to frequency conversion by the RF unit 330 and are converted into signals of an appropriate frequency band (baseband signals). The transmission signals that are transmitted by the antenna 300 are subjected to frequency conversion by the RF unit 330 and are converted into signals of an appropriate frequency band (for example, 2.4 GHz band or 5 GHz band).

The modulating unit 331 performs modulation of transmission signals that includes, for example, predetermined modulation and encoding compliant with the IEEE 802.11 standard, and outputs the modulation result to the DAC unit 332. For example, the modulating unit 331 attaches a PHY header to the MAC frame input from the MAC processing unit 322 so as to form a PHY packet, and then performs modulation, interleaving, and inverse fast Fourier transform (IFFT). The DAC unit 332 performs digital to analog (D/A) conversion of the transmission signals modulated by the modulating unit 331, and outputs analog baseband signals to the RF unit 330.

The ADC unit 333 performs analog to digital (A/D) conversion of the received signals that are received by the RF unit 330, and outputs the post-conversion received signals to the demodulating unit 334. Then, the demodulating unit 334 performs a reception operation including, for example, predetermined demodulation and decoding with respect to the received signals in a manner compliant to the IEEE 802.11 standard, so as to convert the received signals into a PHY packet; then converts the PHY packet into a MAC frame as defined in the IEEE 802.11 standard; and transfers the MAC frame to the MAC processing unit 322. For example, with respect to the digital signals input from the ADC unit 333, the demodulating unit 334 performs Orthogonal Frequency Division Multiplexing (OFDM) symbol timing synchronization, Fast Fourier Transform (FFT) processing, de-interleaving, and error correction and decoding.

A PHY header includes such as information indicating the frame length, the transmission rate, and channel width information. The demodulating unit 334 extracts all such information too. Then, the demodulating unit 334 uses such information for demodulation, and also notifies the MAC processing unit 322 of the information.

Meanwhile, also in the case in which the input signals from the RF unit 330 were not successfully demodulated, if the signals have the signal level equal to or greater than a threshold value, the demodulating unit 334 assumes that the status of the wireless medium (clear channel assessment (CCA)) is busy and issues a notification to the MAC processing unit 322 or, more particularly, to an access control unit 335 described later. When the signals fall below the threshold value, the demodulating unit 334 assumes that the CCA has become idle and issues a notification to the MAC processing unit 322 or, more particularly, to the access control unit 335. Also regarding a PHY packet that was successfully decoded, the demodulating unit 334 obtains, from the information on the PHY header, the period of time for which the concerned PHY packet has been occupying the wireless medium; and notifies the access control unit 335 that the CCA is busy during that period of time.

The MAC processing 322 includes the access control unit 335, a frame analyzing unit 336, and the frame generating unit 337; and performs MAC processing of the IEEE 802.11 wireless LAN. That is, the MAC processing unit 322 generates a MAC frame (for example, a control frame such as a data frame, a management frame, BA, ACK, and CTS) and transfers it to the modulating unit 331.

Based on the CCA signal (indicating whether busy or idle) from the demodulating unit 334, the access control unit 335 performs access control with respect to the wireless medium or, more particularly, performs control related to, for example, the functions of CSMA/CA in the IEEE 802.11 wireless LAN. In the case of transmitting a data frame or a management frame, when the data frame or the management frame to be transmitted is input from the frame generating unit 337, the access control unit 335 issues a transmission instruction to the modulating unit 331 at the timing based on CSMA/CA and inputs the MAC frame to the modulating unit 331.

The frame analyzing unit 336 receives input of the MAC frame extracted from the received signals by the demodulating unit 334, and performs Cyclic Redundancy Code (CRC) check of the received frame based on the address field, the frame type (type information), and the frame check sequence (FCS) field.

When a frame is addressed to the concerned device itself, the frame body field portion of the frame is output to the higher-layer processing units via the I/F 328. Examples of a frame addressed to the concerned device include the case in which the destination address is the unicast address of the concerned device, and the case in which the BSS identifier (BSSID) is identical and the destination address is a broadcast address or a multicast address including the concerned device. In the case of an infrastructure BSS, the BSSID is identical to the MAC address of the AP.

Moreover, when a response frame (an ACK frame, a BlockAck frame, or a Clear To Transmit (CTS) frame with respect to an Request to Transmit (RTS) frame needs to be transmitted with respect to the received MAC address, the frame analyzing unit 336 issues a generation request to the access control unit 335 for generating a response frame. The generation request for generating a response frame includes the specification of the type of the frame that should be generated as the response frame. At that time, since the response frame is transmitted after a certain period of time (normally, the short inter frame space (SIFS)) following the end of the PHY packet including the received frame, the end timing of the concerned received PHY packet, which is obtained via the demodulating unit 334, can be input to the access control unit 335 along with the generation request for generating a response frame.

Meanwhile, the generation request for generating a response frame can also be input to the frame generating unit 337. Then, the response frame can be input from the frame generating unit 337 to the access control unit 335, and the access control unit 335 can input a transmission instruction and the response frame to the modulating unit 331 after a certain period of time since the end of the received PHY packet.

The frame generating unit 337 generates the frame(see FIG. 4) mentioned above. More specifically, the frame generating unit 337 generates a frame that includes the following fields: a first timing (T1) indicating the timing at which the imaging target performs operations (the traffic light 20 changes the color) in such a way that there is a difference among the taken images taken for a plurality of number of times by the imaging unit(imager) 58 described later; a second timing (T2) indicating the timing at which the first timing becomes transmittable; and first position information (G1) indicating the position of installation of the imaging target (the traffic light 20). Regarding a specific method for writing relevant information in the fields indicating the first timing T1, the second timing T2, and the first position information G1, the explanation is given later. Moreover, the frame generating unit 337 generates a frame that further includes a field indicating the type information which indicates the type of the frame. Furthermore, the frame generating unit 337 can include, in the frame, delay amount information ($\Delta$td) that indicates the processing delay occurring till the actual start of transmission of wireless signals to the wireless medium after the access control unit 335 has obtained the access rights with respect to the wireless medium, or can include, in the frame, operation information indicating that the imaging target has performed operations in such a way that there is a difference among the taken images taken for a plurality of number of times.

The MAC processing unit 322 can be partially or entirely configured using hardware or using software. The clock generating unit 324 generates a clock that is used in the roadside communication device 30, and has the function of keeping a TSF timer.

The memory unit 34 is, for example, a flash memory in which the first position information (G1), which indicates the position of installation of the roadside communication device 30, is written from outside and stored. The memory unit 34 can be configured inside the wireless communication processing unit 32. Meanwhile, the memory unit 34 can be substituted with a position information detector that detects the position of installation of the roadside communication device 30. The control unit 36 includes a central processing unit (CPU) 360, and controls the constituent elements of the roadside communication device 30 and performs communication with the traffic light 20.

Meanwhile, the roadside communication device 30 can also be connected to another device via the I/F 328. Moreover, since the roadside communication device 30 functions as an AP, it can be connected to another network using a wired LAN or the like.

Figure 3:
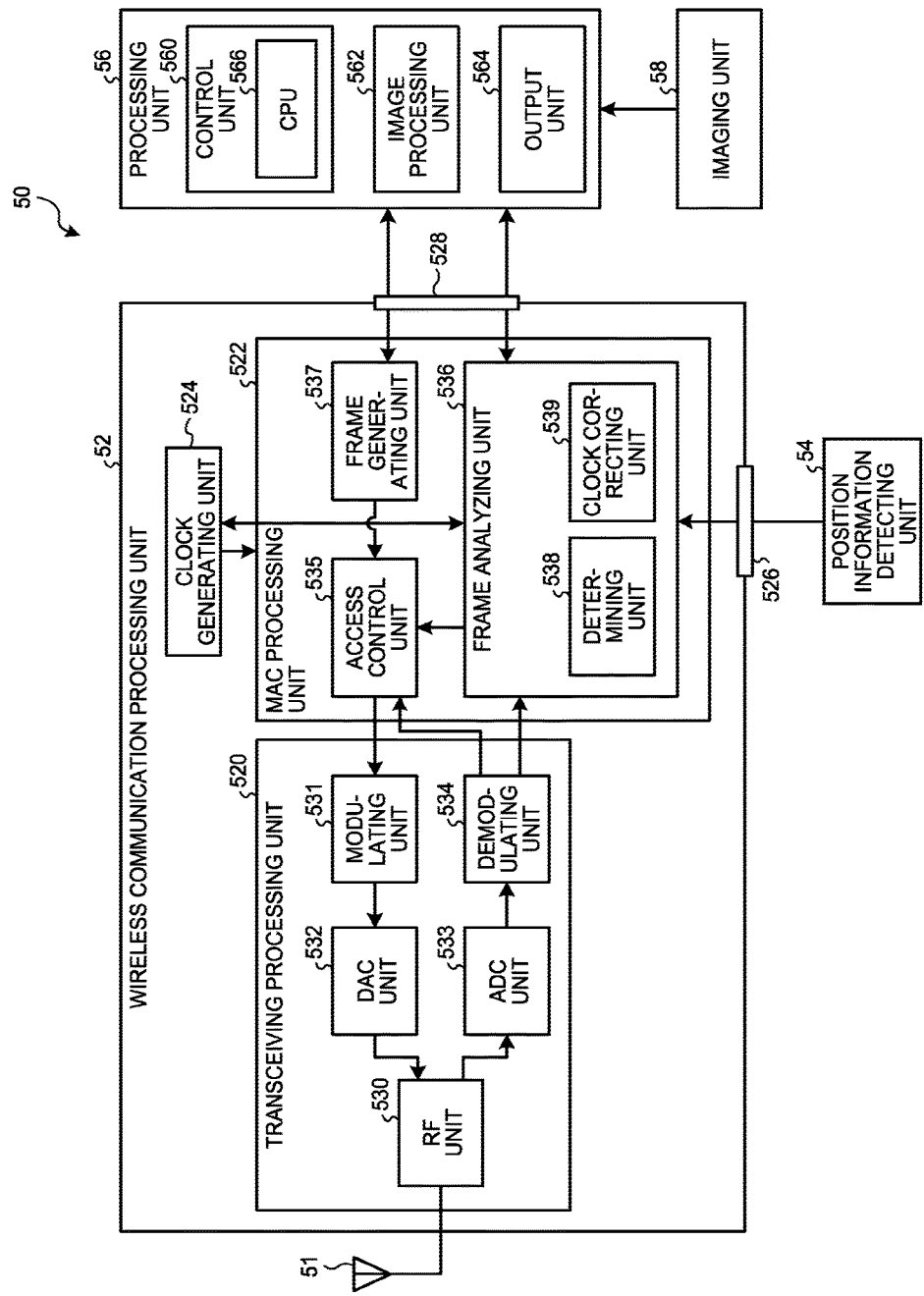
FIG. 3 is a block diagram illustrating an exemplary configuration of a mobile communication device according to the embodiment.

FIG. 3 is a block diagram illustrating an exemplary configuration of the mobile communication device 50. As illustrated in FIG. 3, the mobile communication device 50 includes an antenna 51, a wireless communication processing unit 52, a position information detecting unit (a detector) 54, a processing unit 56, and the imaging unit 58. Since it is installed in the vehicle(mover) 40, the mobile communication device 50 becomes mobile; and is configured to be able to perform wireless communication with the roadside communication device 30 by synchronizing with the clock.

The wireless communication processing unit 52 includes a transceiving processing unit 520, a MAC processing unit 522, and a clock generating unit 524. Moreover, the wireless communication processing unit 52 is connected to the position information detecting unit 54 via an I/F 526 and is connected to the processing unit 56 via an I/F 528.

The transceiving processing unit 520 includes, for example, an RF unit 530, a modulating unit 531, a DAC unit 532, an ADC unit 533, and a demodulating unit 534. The RF unit 530 includes a switch, a low noise amplifier, a PLL, a mixer circuit, a low pass filter, and a power amplifier; and, using the antenna 51, switches between transmission and reception in which high-frequency waves serve as carrier waves.

The modulating unit 531 modulates the transmission signals and outputs the modulated transmission signals to the DAC unit 532. Then, the DAC unit 532 performs D/A conversion with respect to the transmission signals modulated by the modulating unit 531, and outputs the analog transmission signals to the RF unit 530. The ADC unit 533 performs A/D conversion with respect to the received signals that are received by the RF unit 530, and outputs the digital signals to the demodulating unit 534. Then, the demodulating unit 534 demodulates the received signals.

Thus, the transceiving processing unit 520 has the function of a receiver that receives a frame including the first timing (T1), the second timing (T2), and the first position information (G1); as well as has the function of a transmitter that performs transmission via the antenna 51.

The MAC processing unit 522 includes an access control unit 535, a frame analyzing unit 536, and a frame generating unit 537. The access control unit 535 performs access control of the wireless communication performed using the transceiving processing unit 520. The frame analyzing unit 536 includes a determining unit (determiner) 538 and a clock correcting unit 539, and analyzes the frames received via the transceiving processing unit 520.

Based on a third timing (T1') indicating the timing at which the imaging unit 58 captures the traffic light 20 which has performed operations in such a way that there is a difference among the taken images, based on a fourth timing (T2') indicating the timing at which the transceiving processing unit 520 received the frame, based on the first timing (T1), and based on the second timing (T2), the determining unit 538 determines whether or not a frame received by the transceiving processing unit 520 is a frame transmitted in tandem with the operations of the traffic light 20. Alternatively, based on the type information or the delay amount information Δtd specified in the frame transmitted by the roadside communication device 30, the determining unit 538 can determine whether or not a frame received by the transceiving processing unit 520 is a frame transmitted in tandem with the operations of the traffic light 20.

When the determining unit 538 determines that the frame received by the transceiving processing unit 520 is a frame transmitted in tandem with the operations of the traffic light 20, the clock correcting unit (a corrector) 539 corrects the clock timing based on the first position information (G1), second position information (G1'), third position information (G2'), the first timing (T1), the second timing (T2), the third timing (T1'), and the fourth timing (T2').

The frame generating unit 537 generates a frame representing transmission signals. The MAC processing unit 522 can be partially or entirely configured using hardware or using software. The clock generating unit 524 generates a clock that is used in the wireless communication processing unit 52.

The position information detecting unit (a detecting unit) 54 detects the position of the mobile communication device 50, which is installed in the vehicle 40, using the global positioning system (GPS) and an acceleration sensor, for example. More specifically, the position information detecting unit 54 detects the second position information (G1'), which indicates the position of the imaging unit 58 described later at the time when the imaging unit 58 captures the traffic light 20 which has performed operated in such a way that there is a difference among the taken images, and detects the third position information (G2'), which indicates the position of the imaging unit 58 at the time when the transceiving processing unit 520 receives a frame.

The processing unit 56 includes a control unit 560, an image processing unit 562, and an output unit 564. The control unit 560 controls the constituent elements of the mobile communication device 50. For example, when the timer interval at which the determining unit 538 obtains the third timing exceeds a predetermined threshold value, the control unit 560 performs control to make the determining unit 538 to stop performing determination. Subsequently, when the determining unit 538 newly obtains the third timing, the control unit 560 performs control to make the determining unit 538 to resume performing determination. The image processing unit 562 processes images that are taken by the imaging unit 58 described later. The output unit 564 includes a display device such as a liquid crystal display (LCD) and a speaker, and performs output to the user.

The imaging unit 58 is, for example, a digital camera that takes images of a few tens of frames per second and outputs the taken images to the processing unit 56. More particularly, for example, the imaging unit 58 continuously captures the traffic light 20 representing the imaging target and outputs a plurality of taken images having a difference therebetween (taken before and after the changes in the color of the traffic light 20).

Figure 4:
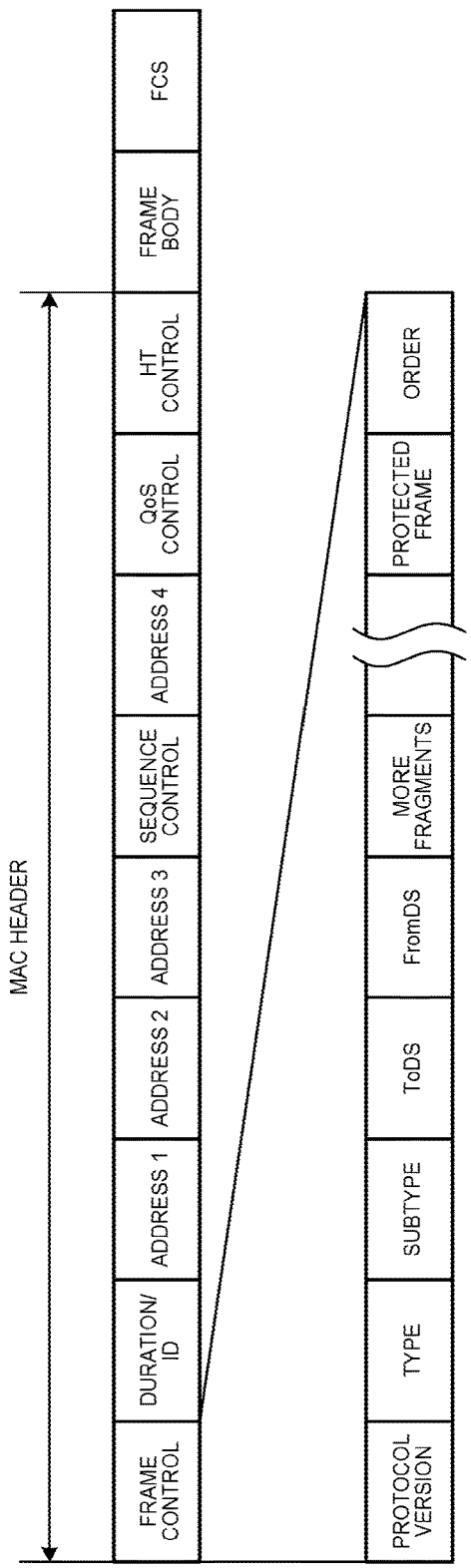
FIG. 4 is a diagram illustrating a configuration of a Media Access Control (MAC) frame in the IEEE 802.11 standard.

Given below is the more detailed explanation of the operations performed in the communication system 10. FIG. 4 is a diagram illustrating a configuration of a Media Access Control (MAC) frame in a wireless LAN system of the IEEE 802.11 standard.

The IEEE 802.11 standard (IEEE Std 802.11) also includes the IEEE 802.11a standard, the IEEE 802.11b standard, the IEEE 802.11g standard, the IEEE 802.11n standard, the IEEE 802.11ac standard, and such as the IEEE 802.11ax standard that represents the IEEE 802.11 standards defined hereafter. A MAC frame includes a MAC header portion, a frame body portion, and a frame check sequence (FCS) portion.

The MAC header portion is used to set the necessary information for the reception operation in the MAC layer. The frame body portion is used to set the information (such as the data from higher layers) corresponding to the frame type. The FCS portion is used to set the cyclic redundancy code (CRC) representing the error detection code used in determining whether or not the MAC header portion and the frame body portion have been received correctly.

The MAC header portion includes a frame control field and a duration/ID field in which values corresponding to the frame type are set. The duration/ID field is used to set the period of time for transmission standby (network allocation vector: NAV) or to set the terminal identification number (association ID: AID) assigned to the STA connected with the AP. The duration/ID field has the length of 16 bits. When the most signification bit (MSB) is set to 0, the lower 15 bits indicate the duration (NAV). When the MSB is set to 1, some part of the lower 15 bits indicates the AID. Herein, the AID is assigned by the AP during the procedure of establishment of a connection of the STA with the AP.

More particularly, in the case of approving establishment of a connection to an STA that has transmitted an association request frame, the AP inserts the AID, which is locally determined in the BSS for the concerned STA, in an association response frame and transmits the association response frame to the concerned STA. In the association response frame, the AID is inserted in the frame body portion. The STA reads the AID from the association response frame, and thus gets to know its own AID. As a result of receiving an association response frame indicating connection approval from the AP, the STA becomes a member of the BSS formed by the AP and thereafter can communicate with the other STAs belonging to the same BSS via the AP or by following an appropriate procedure. Such a process for establishing a connection between the AP and an STA is called an association process. Before performing the association process with an STA, the AP can perform an authentication process. Meanwhile, in the case of using the IEEE 802.11 standard for ITS usage, the premise is that an STA representing a mobile communication device moves around and does not remain in a single BSS. Hence, the communication can be done without performing the authentication process and the association process. In that case, the AID is not used.

Meanwhile, there exists a plurality of address fields. In an address 1 field, the MAC address of the immediate receiving station (receiving STA address: RA) is set. In an address 2 field, the MAC address of the immediate transmitting station (transmitting STA address: TA) is set. In an address 3 field, the MAC address of the final destination device (destination address: DA) is set for the uplink, and the MAC address of the source device is set for the downlink. An address 4 field exists only when the concerned AP performs transmission to another AP and is used to set the MAC address of the device representing the source of data generation (source address: SA). Depending on the frame type distinguished by a type/subtype field explained below, the number of address fields differs.

A sequence control field is used to set the sequence number of the data to be transmitted or the fragment number in the case in which the data is fragmented. Meanwhile, in the frame control field, the following fields are present: a type field indicating the frame type; a subtype field; a "ToDS" field; a "FromDS" field; a more fragments field; a protected frame field; and an order field.

Depending on the bit string set in the type field, the frame type of the MAC frame can be recognized from among the following frame types: a control frame, a management frame, and a data frame. Moreover, the bit string set in the subtype field indicates the type of the MAC frame in each frame type. In the "ToDS" field, information is set that indicates whether the receiving station is an AP or a non-AP STA (i.e., an STA not operating as an AP). In the "FromDS" field, information is set that indicates whether the transmission station is an AP or a non-AP STA.

The more fragments field holds information that, when the data is fragmented, indicates whether or not a trailing fragment frame is present. In the protected frame field, information is set that indicates whether or not the concerned frame is protected. The order field is used to set information indicating that, during the relay of frames, the order of frames should not be changed, or information indicating whether an HT control field is present as described later.

In a Quality of Service (QoS) data frame representing one of the data frames, a QoS control field is added. On the other hand, in the case of non-QoS data, the QoS control field is not added. In FIG. 4, the QoS control field is illustrated. Regarding whether a frame is a QoS data frame or a non-QoS data frame, when a data frame is recognized from the type field of the frame, it can be recognized by further checking the bit string set in the subtype field The QoS control field includes such as a TID field for setting an identifier corresponding to the data traffic(there are 16 types from 0 to 15) and an ack policy field for setting the delivery confirmation method. If the TID field is checked, it becomes possible to recognize the type of traffic of the data. Moreover, if the ack policy field is checked, whether the concerned QoS data frame was transmitted according to the normal ack policy, or the block ack policy, or the no ack policy can be determined and used in deciding whether or not a response frame needs to be transmitted and in deciding the type of the response frame.

A High Throughput (HT) control field is present when "1" is set in the order field for QoS data or for a management frame. The HT control field is expandable to a Very High Throughput (VHT) control field as well as expandable to a High Efficient (HE) control field; and a notification can be issued according to various functions of the 802.11n standard, the 802.11ac standard, or the 802.11ax standard.

Meanwhile, the configuration of the MAC header portion is not limited to the fields explained above. For example, as in the case in which the QoS control field is added in the IEEE 802.11e standard, when a new standard of IEEE 802.11 is defined, new fields are sometimes added to the MAC header portion too.

Given below is the detailed explanation of the operations performed in the communication system 10. The roadside communication device 30 transmits a beacon in tandem with the timing of each change in the color of the traffic light 20. For example, when the information indicating a change in the color of the traffic light 20 (since the information is indicated by the difference between the taken images taken before and after the change, it is sometimes written as image change information) is obtained, the roadside communication device 30 generates a beacon frame including the information (the image change information) using the frame generating unit 337, and transmits the beacon frame.

In the IEEE 802.11 wireless LAN standard, in the frame body portion of a management frame, information is inserted in fixed-length fields or variable-length fields. For example, in a beacon frame, the timestamp field, a beacon interval field, and a capability field are fixed-length fields, and it is decided that the information is firstly inserted in the timestamp field, the beacon interval field, and the capability field in that order in the frame body portion.

The timestamp field is used to carry the TSF timer value. The beacon interval field is used to carry the transmission interval of the beacon frame. The capability field is used to carry the attributes of the STA (or in the infrastructure BSS, the AP) that transmits the beacon frame, or to carry the fundamental attributes of BSS.

On the other hand, a variable-length field is commonly called an information element (IE) field that includes a subfield for identifying the type, a subfield indicating the length of an information subfield portion, and the information subfield portion. As the fundamental configuration, the subfield for identifying the type is an element ID field, and the subfield indicating the length of the information subfield portion is a length field. Moreover, the information subfield can be further divided into a plurality of fields. As long as whether or not continuous information subfields are present can be identified according to the element ID or by sequentially checking the information subfields in some situations; it serves the purpose.

At the time of extracting the initial IE field from the frame body portion of a received management frame, the receiving STA (including the AP) detects the end position of the IE field by referring to the length field, and extracts the frame body portion of that section as the IE field. If the frame body portion still continues, IE field extraction is done in an identical manner assuming that the next IE field is present.

Basically, IE fields likely to be inserted in each management frame are decided, and the order of insertion is also decided.

Figures 5, 6:
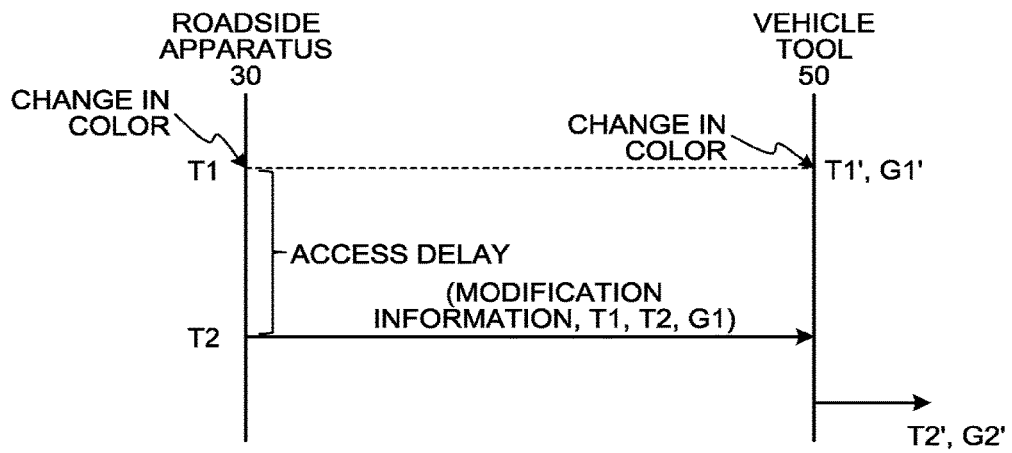
FIG. 5 is a diagram illustrating an example of a synchronization assistance element.
FIG. 6 is a diagram illustrating the relationship between information used in determination and correction performed in the mobile communication device.

In a frame transmitted by the roadside communication device 30, the IE field as illustrated, for example, in FIG. 5 is assumed to be included in the frame body field of the beacon. This IE field is called, for example, a synchronization assistance element field. Moreover, the IE field is assigned with a unique identifier so as to make it distinct from the other existing IEs. In the synchronization assistance element field, the information subfield is assumed to be further divided into three subfields, namely, a change info subfield, a change time subfield, and a location subfield. It is desirable that each of the three subfields in the information subfield has a fixed length.

The frame generating unit 337 receives input of the image change information; inserts the image change information in the change info subfield of the synchronization assistance element field; obtains the first timing T1, at which the image change information was input, from the clock generating unit 324; and inserts the first timing T1 in the change time subfield of the synchronization assistance element subfield. Moreover, the frame generating unit 337 obtains the first position information G1 of the roadside communication device 30 from the memory unit 34, and generates a beacon frame in which the first position information G1 is inserted in the location subfield of the synchronization assistance element field.

For example, regarding the image change information, if it is sufficient that the roadside communication device 30 needs to notify the mobile communication device 50 of only a change in the color of the traffic light 20, since the number of colors of the traffic light 20 are limited, it serves the purpose as long as each color before and after a change can be identified. Hence, limited information can be input as the image change information. In that regard, at the stage of generating the synchronization assistance element field, the frame generating unit 337 can perform desired processing on the image change information input thereto and reduce the volume of information so that the image change information can fit in the change info subfield.

When the beacon frame is input from the frame generating unit 337, the access control unit 335 starts performing access control with respect to the wireless medium. Once the access control unit 335 obtains the access right to the wireless medium, the frame generating unit 337 obtains the time to be carried in the timestamp field of the beacon frame from the clock generating unit 324.

In order to ensure that the second timing T2, which is actually recorded in the timestamp field by the access control unit 335, is equal to the timing at which a data symbol including the initial bit of the timestamp field of the concerned beacon frame is actually transmitted in the wireless medium, the internal delay amount Δtd is assumed to be added to the timing obtained from the clock generating unit 324. In the case of including the processing delay amount Δtd in the frame, the frame generating unit 337 or the access control unit 335 holds in advance the value of the processing delay amount Δtd and records that value in the concerned field. Alternatively, the concerned delay amount Δtd is assumed to be retained in the storage 34, the frame generating unit 337 or the access control unit 335 reads out the concerned processing delay amount, and records the value of Δtd in the concerned field. Then, the access control unit 335 inputs, as a transmission request to the modulating unit 331, the beacon frame having the timestamp field embedded therein. At the time of inputting a transmission request to the modulating unit 331, an instruction about the modulation and the coding scheme (MCS) at the time of transmission can be input along with the transmission request. Then, the concerned beacon frame is transmitted as a PHY packet in the wireless medium.

Given below is the explanation of the operations performed by the mobile communication device 50 for the purpose of receiving a frame. The mobile communication device 50 captures the traffic light 20 using the imaging unit 58, and obtains the image change information (the information indicating a change in the color of the traffic light 20) specified in a beacon frame transmitted by the roadside communication device 30.

That is, as the image change information, the information indicating a change in the color of the traffic light 20 is input to the frame analyzing unit 536 of the mobile communication device 50. When the image change information is input, the frame analyzing unit 536 obtains and holds the third timing T1' from the clock generating unit 524, and obtains and holds second position information G1' of the concerned vehicle from the position information detecting unit 54. Moreover, the frame analyzing unit 536 obtains the beacon frame, which is transmitted by the roadside communication device 30, via the transceiving processing unit 520.

Meanwhile, before determining the type of the frame, the frame analyzing unit 536 firstly obtains the timing from the clock generating unit 524 at the stage of extracting the initial bit of the frame body unit of the MAC frame input from the demodulating unit 534; subtracts the processing delay occurring between obtaining the received signals and extracting the bit; and holds the result as the fourth timing T2'.

Moreover, at the stage of extracting the initial bit of the frame body portion of the MAC frame, the frame analyzing unit 536 obtains and holds the third position information G2' of the mobile communication device 50 from the position information detecting unit 54. Then, the frame analyzing unit 536 makes use of the determining unit 538 to determine whether or not the received beacon frame is a frame transmitted in tandem with the image change information.

As the method for determining whether or not the received frame is a frame transmitted in tandem with the image change information, for example, the determining unit 538 sets the determination criteria that the received frame is a beacon frame and includes the synchronization assistance element. However, instead of a beacon frame, if a different type of a management frame including the synchronization assistance element is defined, the determining unit 538 can perform the determination according to the type (the subtype level) of that management frame.

When the synchronization assistance element is included, for example, that fact can be notified using a usually-unused bit of the MAC header portion, and the determining unit 538 can perform the determination using that bit. In that case, before actually extracting the synchronization assistance element, the determining unit 538 can determine that the received frame is a frame transmitted in tandem with the image change information.

When the received frame is a frame transmitted in tandem with the image change information (when the determination result indicates true), the frame analyzing unit 536 obtains, from the synchronization assistance element, the image change information, the first timing T1 related to the image change, and the first position information G1, obtains the second timing T2 from the timestamp field, and determines whether or not the obtained image change information is identical to the latest image change information that is input.

Herein, any difference in the information related to the angle of capturing the same target and the image quality is deemed acceptable.

For example, in the sets of change information regarding the color of the traffic light 20, it can be said that the information has matched at the level of "the color changed from green to yellow according to both sets of information". When the two sets of image change information are identical, based on the third timing T1', the second position information G1', the fourth timing T2', and the third position information G2' that is held as well as based on the first timing T1, the first position information G1, and the second timing T2, the clock correcting unit 539 corrects the clock generated by the clock generating unit 524. At that time, for example, assuming that Δt1 represents T1'-T1 (can be a negative value too) and Δt2 represents T2'-T2 (can be a negative value too), the clock correcting unit 539 can correct the clock only when the difference (the absolute value) between Δt1 and Δt2 is equal to or smaller than a predetermined threshold value. Moreover, only when the difference (the absolute value) between Δt1 and Δt2 is equal to or smaller than a predetermined threshold value, the determining unit 538 can be configured to determine whether or not the frame received by the transceiving processing unit 520 is a frame transmitted in tandem with the operations of the traffic light 20. Furthermore, when the processing delay amount Δtd is also notified in the frame, the difference between Δt1 and Δt2 can be corrected by taking into account a processing delay amount Δtd' representing the delay occurring between the reception of signals from the wireless medium of the concerned terminal device and obtaining the fourth timing T2', and by taking into account the notified processing delay amount Δtd.

If the difference between Δt1 and Δt2 is greater than the threshold value, or in the case in which, although the received frame is determined to be a frame transmitted in tandem with the image change information, the image change information that is input as the target for comparison to the frame analyzing unit 536 is for example, not within a timing before or after a certain period of time with respect to the first timing T1, or if the compared sets of image change information are determined not to be identical, then the frame analyzing unit 536 requests the output unit 564 via the I/F 528 to output a warning signal. Then, the output unit 564 outputs a warning signal using, for example, a display device such as an LCD or using a speaker as well as can output a warning signal to the imaging unit 58.

Herein, outputting such a warning signal is effective as the self-check function in the mobile communication device 50 (for example, for checking the possibility of malfunctioning of the imaging unit 58). Even in the case in which a large shielding object such as a truck is present between the mobile communication device 50 and the roadside communication device 30, identical determination is done. In that case, a warning can also be issued about the excessively short distance between the vehicles. Moreover, a warning can also be issued about the possibility of identity theft of the roadside communication device 30.

In the case in which the image change information is input to the frame analyzing unit 536 and a frame is expected to be received in tandem with the image change information, there are times when the concerned frame is not received. In the case in which no frame is received for a certain period of time after the third timing T1' or for a period of time equivalent to N number of times of the expected beacon interval (where N≥1 holds true, for example, N=1.5) from the roadside communication device 30, under the assumption that the mobile communication device 50 has moved away from the communication area of the roadside communication device 30, in order to start inter-vehicle communication, an independent BSS (IBSS) can be formed only with non-AP STAs and without an AP. More particularly, the mobile communication device 50 starts the transmission of a beacon frame.

In FIG. 6 is illustrated the following: the input of the image change information (modification information) to the roadside communication device 30 and the mobile communication device 50; the operations related to the transmission and reception of frames in tandem with the image change information; and the extracted information. Given below is the explanation of the operations performed by the clock correcting unit (a correcting unit) 539 for correcting the clock based on the information illustrated in FIG. 6.

Figure 7A:
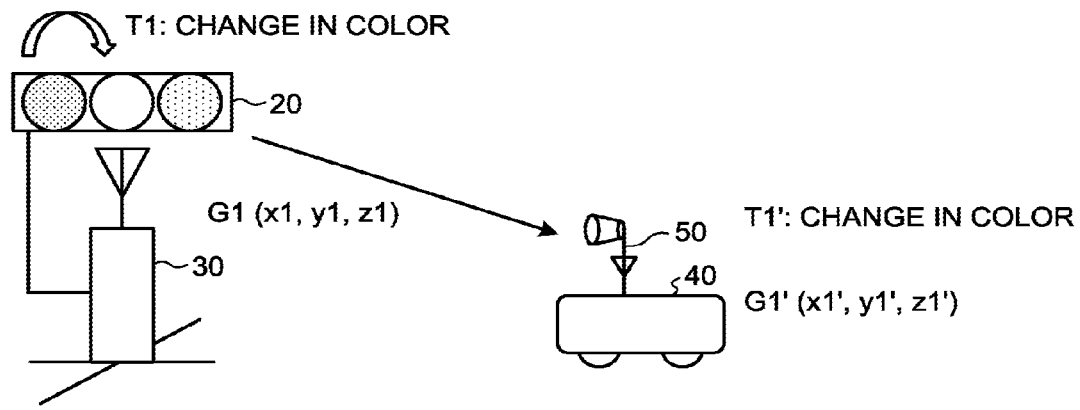
FIGS. 7A and 7B are diagrams illustrating the relationship of the positions of the roadside communication device and the mobile communication device with the timings.
Figure 7B:
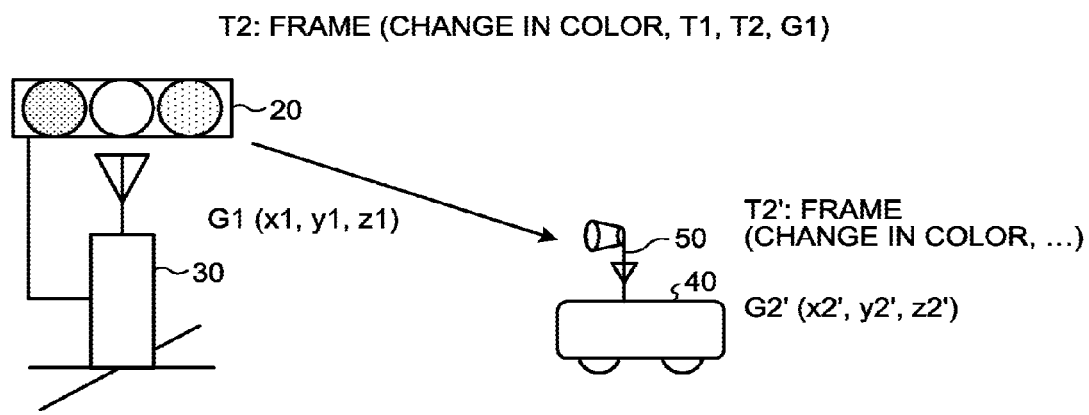

FIGS. 7A and 7B are diagrams illustrating the relationship of the positions of the roadside communication device 30 and the mobile communication device 50 with the timings. The roadside communication device 30 is installed at a position (x1, y1, z1) indicated by the first position information G1.

As illustrated in FIG. 7A, at the first timing T1, the traffic light 20, which operates in tandem with the roadside communication device 30, varies the color of the light from green to yellow. The mobile communication device 50, which is at a position (x1', y1', z1') indicated by the second position information G1', detects the change in the color of the traffic light 20, and recognizes the detection as the third timing T1'. At that time, the position information between the roadside communication device 30 and the mobile communication device 50 has the relationship with the timestamp value as expressed below in Equation 1.

[Expression 1]

$$|G1'-G1|=\alpha(T1'+\Delta O-T1)=\alpha(\Delta t1+\Delta O) \tag{1}$$

As illustrated in FIG. 7B, in response to the change in the color of the traffic light 20, the roadside communication device 30 inserts the information indicating the change in the color from green to yellow, inserts the first timing T1, and inserts the first position information G1 of itself in the synchronization assistance element of a beacon frame, and further inserts the second timing T2 in the timestamp field of the beacon frame, and transmits the beacon frame. Herein, it is assumed that the position information of the roadside communication device 30 does not change from the position information at the first timing T1 even during the transmission of the beacon frame.

The mobile communication device 50 receives the beacon frame, and extracts and holds the information specified in the synchronization assistance element and the value of the timestamp field. At that time, the second position information G1' indicates a position (x2', y2', z2') of the mobile communication device 50. Moreover, the position information between the roadside communication device 30 and the mobile communication device 50 has the relationship with the timestamp value as expressed below in Equation 2.

[Expression 2]

$$|G2'-G1|=\beta(T2'+\Delta O-T2)=\beta(\Delta t2+\Delta O) \tag{2}$$

Herein, ΔO represents the error of the clock of the mobile communication device 50 with respect to the clock of the roadside communication device 30. When the relationship in Equation 3 given below is established, the determining unit 538 sets the received frame as the target for comparison.

[Expression 3]

$$|\Delta t2-\Delta t1|\leq \Delta Th1 \tag{3}$$

Herein, ΔTh1 can be made variable in tandem with the acceleration information of the mobile communication device 50. Accordingly, if α≅β is assumed to hold true, because of the relationship in Equation 4 given below, the correction value ΔO can be derived using Equation 5 given below.

[Expression 4]

$$\frac{|G2' - G1|}{|G1' - G1|} = \frac{\Delta t2 + \Delta O}{\Delta t1 + \Delta O} \quad (4)$$

[Expression 5]

$$\Delta O = \frac{|G1' - G1|\Delta t2 - |G2' - G1|\Delta t1}{|G2' - G1| - |G1' - G1|} \quad (5)$$

Meanwhile, when the correction value ΔO exceeds a threshold value, it can be determined not to perform updating because of the possibility of identity theft of the roadside communication device 30. In the case of determining not to perform updating, the frame analyzing unit 536 requests the output unit 564 via the I/F 528 to output a warning signal as described earlier.

Even in the case in which the concerned mobile communication device 50 constitutes an independent BSS (IBSS) with another mobile communication device 50, as long as the beacon frame can be received from the roadside communication device 30 and the information of the infrastructure BSS configured by the roadside communication device 30 can be collected, when the concerned mobile communication device 50 enters the communication area of the infrastructure BSS configured by the roadside communication device 30, it becomes possible for the concerned mobile communication device 50 to promptly participate in that infrastructure BSS.

If the first position information G1 is configured to be constantly inserted, for example, in the beacon frame transmitted by the roadside communication device 30, at the stage when the beacon frame is initially received, adjustment can be made in the mobile communication device 50 so that the imaging unit 58 faces the roadside communication device 30 according to the relationship with the position of the mobile communication device 50. Thereafter, synchronization assistance coupled to the image change information can be performed.

Herein, for example, the synchronization assistance element illustrated in FIG. 5 is constantly inserted, and a notification is issued even if only the location field (G1) is included. Alternatively, without using the synchronization assistance element illustrated in FIG. 5, an information element in which the first position information G1 corresponding to the location field is inserted is defined separately from an information element in which information equivalent to the change info field and the change time field is inserted, and the information element having the first position information G1 inserted therein is constantly included in the frame.

When a beacon frame is received from the roadside communication device 30, the mobile communication device 50 can perform a predetermined process for establishing a connection with the roadside communication device 30 and then can start exchanging data frames with the roadside communication device 30. Examples of the predetermined process include the authentication process and the association process in the IEEE802.11 wireless LAN. The authentication process is started when the mobile communication device 50 transmits an authentication frame to the roadside communication device 30, while the association process is started when the mobile communication device 50 transmits an association request frame to the roadside communication device 30. As described earlier, the authentication process and the association process can be skipped when the mobile communication device 50 starts exchanging data frames with the roadside communication device 30.

In this case, during the transmission of an authentication frame or an association request frame, as given in the explanation of the roadside communication device 30, the medium is accessed based on CSMA/CA. Moreover, in an authentication frame or an association request frame, the MAC address of the roadside communication device 30 is specified as the destination address (the receiving STA address (RA) that is commonly inserted in the address 1 field). That is, the authentication frame or the association request frame becomes a unicast frame. Upon receiving such a frame, the roadside communication device 30 transmits an Ack frame to the mobile communication device 50 after the post-reception SIFS.

Herein, for example, there may be a case in which the mobile communication device 50 detects the change of the color of the traffic light 20 before passing by the roadside communication device 30 but receives the beacon frame, which is transmitted in tandem with the change, after passing by the roadside communication device 30. Hence, it is desirable that the image change information (in this case, the color change information) as well as the position information and the timing information obtained and held at that time are held for a certain period of time.

Meanwhile, when the roadside communication device 30 operates in tandem with the traffic light 20, supplementary information can be included in the frame for enabling the mobile communication device 50 to identify the traffic light 20 in tandem with which the frame is transmitted. Normally, the traffic light 20 at an intersection is installed with respect to each approach lane and is thus present in plurality. Thus, for example, supplementary information indicating the direction of the concerned traffic light 20 at the intersection is included in the frame. The supplementary information can be inserted in the frame using the format of the information element (IE) field as described earlier. For example, in the information field portion of the synchronization assistance element field illustrated in FIG. 5, the supplementary information indicating the direction of the concerned traffic light 20 at the intersection is added as a signal direction subfield.

As another method for getting information, the frame to be transmitted from the roadside communication device 30 can be configured to have the directionality in the same direction as the traffic light 20 operating in tandem, and then the frame is transmitted. For example, a plurality of sector antennas is installed, and the direction of each sector antenna is matched with that of each traffic light. Then, at the time of transmitting a frame including the color change information of a particular traffic light 20, the frame is transmitted using the sector antenna corresponding to the direction of the concerned traffic light 20.

Alternatively, a plurality of antennas is installed and configured to have directionality by weighting. Then, at the time of transmitting a frame including the color change information of a particular traffic light 20, the frame is transmitted after being set to have directionality using weighting corresponding to the direction of the concerned traffic light 20. Herein, the weighting can be decided in advance according to the directions of the traffic lights 20 and can be stored in a memory. Then, the weighting can be read and applied at the time of performing antenna control. Meanwhile, the information on the color change is not limited to the change among the three colors of green, yellow, and red. Rather, by enabling expression of the right-turn signal display and the left-turn signal display, it becomes possible to increase the opportunities for performing the operation of synchronization correction using the image change information and the frame.

Given below is the explanation of a modification example of the communication system 10. Herein, the fact that the roadside communication device 30 performs communication with the traffic light 20 and the fact that the change in the color of the traffic light 20 is linked with the transmission of wireless signals are same as the explanation given earlier. However, in this configuration, the color of the traffic light 20 is changed in tune with the transmission of wireless signals. Moreover, it is assumed that even if a change in the color of the traffic light 20 varies by about 100 ms, there is no issue as far as safety and security is concerned, and that the beacon frame can be transmitted using the time division multiple access (TDMA) without any access delay.

The roadside communication device 30 is assumed to insert the color change information at the timing T1 at which the transmission of a beacon frame is scheduled, and inputs a color change request from the frame generating unit 337 via the I/F 328 to the traffic light 20 at a timing preponed in advance by a time period Δtd1 that is taken for the operation of changing the color of the traffic light 20. Herein, Tc represents the beacon interval, and each timing at which the clock becomes an integral multiple of the beacon interval Tc represents the timing T1.

The information inserted in tandem with the change in the color of the traffic light 20 is same as the information explained earlier. However, herein, since the information related to the second timing T2 becomes identical to the first timing T1 (that is, timestamp information), it can be omitted. As a result, the change time subfield is not needed.

In the mobile communication device 50, the color change is detected by the imaging unit 58 and held as image change information; and the timing at which the image change information is input to the frame analyzing unit 536 is obtained from the clock generating unit 524 and held as the third timing T1'. The mobile communication device 50 receives the beacon frame transmitted by the roadside communication device 30. The frame analyzing unit 536 extracts the image change information, the first timing T1, and the first position information G1 from the received beacon frame, and holds the information. Then, the image change information held by the mobile communication device 50 is compared with the image change information in the beacon frame.

If the determining unit 538 determines that the same change is detected (such as the image change information having a correlation of a certain level or more), then the clock correcting unit 539 considers T1-T1' as the correction value ΔO and corrects the clock. At that time, the addition of the own clock value and the correction value ΔO can be set as the new clock. However, since actually the propagation delay is present between the roadside communication device 30 and the mobile communication device 50, or more precisely, between the traffic light 20 and the mobile communication device 50, it is desirable to correct the clock in view of that propagation delay. In that case, in the mobile communication device 50, the color change is detected by the imaging unit 58, and the first position information G1' of the concerned mobile communication device 50 at the third timing T1', at which the color change information is input to the frame analyzing unit 536, is obtained from the position information detecting unit 54 and held.

The propagation delay Δd is estimated from |G1'-G1|. The estimation of the propagation delay Δd is performed using, for example, the line of sight (LOS) and under the assumption that attenuation occurs according to the square-root law. However, when there is an increase in the distance from the roadside communication device 30 (to be precise, from the traffic light 20), the square-root law generally becomes inapplicable. Hence, the estimation can be implemented only when |G1'-G1| is equal to or smaller than a particular threshold value. Although the mobile communication device 50 does not detect the image change information, when a beacon frame notifying the image change information is received or when it is determined that the image change information is detected at the same time but the same change is not detected, the frame analyzing unit 536 requests the output unit 564 via the I/F 528 to output a warning signal.

Figure 9:
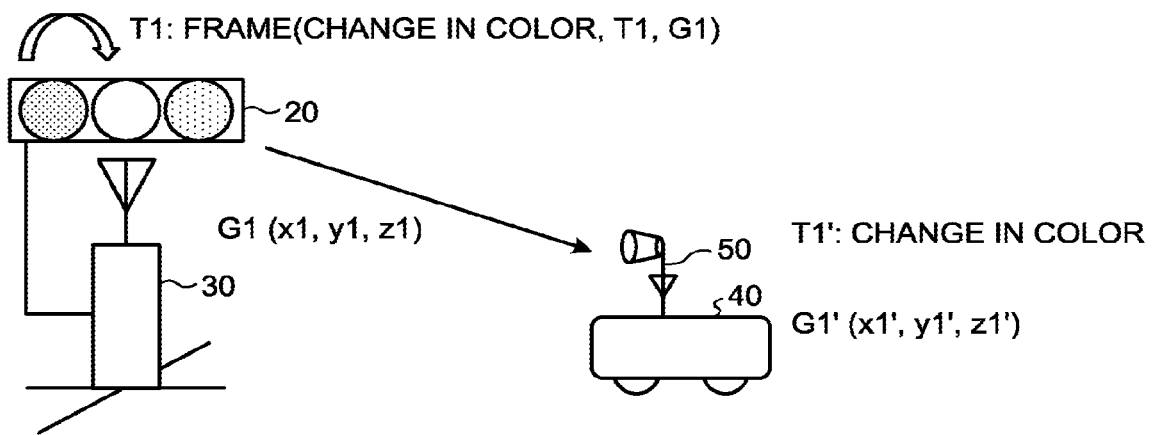
FIG. 9 is a diagram illustrating the relationship of the positions of the roadside communication device and the mobile communication device with the timings.

In FIG. 8, the input of the image change information to the roadside communication device 30 and the mobile communication device 50 is illustrated along with the operations and the extracted information related to the transmission and reception of frames done in tandem with the input. In FIG. 9, the positional relationship between the mobile communication device 50 and the roadside communication device 30 is illustrated. When the correction value ΔO exceeds a particular threshold value, it can be determined not to perform updating because of the possibility of identity theft of the roadside communication device 30.

Meanwhile, the roadside communication device 30 need not always perform communication with the traffic light 20, and the image change information is not limited to the changes in the color of the traffic light 20. Alternatively, for example, the roadside communication device 30 can include a camera for observing a fixed location and, when there is a difference among a plurality of taken images obtained during the observation of the fixed location, a frame including information about the difference can be transmitted. Herein, examples of the fixed location include a roadside information device such as an electrical bulletin board, an Electronic Toll Collection (ETC) system receipt display device installed at a toll booth, and the bar of a gate of an ETC system. For example, in tandem with the up-and-down movement of an ETC gate bar, the roadside communication device 30 can transmit a frame including the change information.

On the other hand, the mobile communication device 50 that is mobile includes the imaging unit 58 for capturing the up-and-down movement of an ETC gate bar, and inputs the change information to the wireless communication processing unit 52. Alternatively, the mobile communication device 50 can capture the opening and closing of the crossing gate of a railroad crossing. In that case, in tandem with the opening and closing of the crossing gate, the roadside communication device 30 can transmit a frame including the change information.

Moreover, in the communication system 10, for example, as the image change information, the next change or the next change along with the scheduled timing can be inserted in advance in a frame. As a result, for example, the mobile communication device 50 can determine the reliability of the frame that is transmitted in tandem with the image change information received next.

If a plurality of roadside communication devices 30 is linked, and if it can be known in advance according to path prediction about which roadside communication device 30 is next, then, for example, as a result of the concerned roadside communication device 30 notifying the change and the scheduled timing of the change involving the other roadside communication devices 30, the mobile communication device 50 can confirm the reliability of the concerned roadside communication device 30 even if there is a change in the roadside communication device 30 from which the mobile communication device 50 receives a frame. Moreover, since the image change information can be predicted, the mobile communication device 50 can reflect the image change information in the automated driving including deceleration/acceleration.

Given below is the detailed explanation of the IEEE802.11 wireless LAN used as an example of the wireless communication performed in the communication system 10. Herein, the explanation is particularly given about the frame types in the wireless communication system, the method for cutting off the inter-station connection, the access method in the wireless LAN system, and the frame interval of the wireless LAN.

Firstly, the explanation is given about the frame type in the communication system. Generally, the frames used in the wireless access protocol in the wireless communication system are broadly divided into three types, namely, data frames, management frames, and control frames. The type is normally specified in the header portion provided in common among the frames.

In the IEEE802.11 wireless LAN standard, the frame type is specified in the type field illustrated in FIG. 4. A management frame is used in managing the physical communication link with another STA. Examples of a management frame include a frame used in performing the communication setting with another STA, a frame for releasing the communication link (that is, cutting off the connection), and a frame related to the power saving operation in the concerned STA.

A data frame transmits data, which is generated in the concerned STA, to another STA after a physical communication link with the other STA has been established. Herein, the data is generated in a higher layer, and is generated in response to, for example, a user operation.

A control frame is used in performing control in the case of communicating (exchanging) data frames with another STA. When the concerned STA receives a data frame or a management frame, the response frame that is transmitted for the purpose of transmission confirmation represents a control frame.

These three types of frames are subjected to as-needed processing in the physical layer and are transmitted as physical packets via antennas. During the procedure for establishing a connection, an association request frame and an association response frame represent management frames, and an Ack(acknowledgement) frame representing a control frame is transmitted to the association request frame as well as the association response frame.

Given below is the explanation of methods for cutting off the connection between STAs. There is an explicit method and an implicit method for cutting off a connection or a disassociation frame. In the explicit method, one of the connected STAs transmits a frame for disconnection. That frame is classified as a management frame. The frame for disconnection is sometimes called, for example, a release frame because it releases the connection.

Normally, in the STA that transmits a release frame, the cutting off of the connection is determined at the point of time of transmitting the release frame. In the STA that receives the release frame, the cutting off of the connection is determined at the point of time of receiving the release frame. Then, a non-AP STA returns to the initial state in the communication phase such as to the state of searching for a partner STA for communication. The reason for transmitting a frame for the purpose of disconnection may be that it is no more possible to secure a physical wireless link due to an increase in the communication distance from the communication partner STA thereby leading to not being able to receive nor decode the wireless signals.

Meanwhile, in the implicit method, if transmission of frames (transmission of data frames and management frames, or transmission of response frames in response to received frames) is not detected for a certain period of time from a communication partner STA with which the connection has been established, it is determined that the connection has been cut off. Such a method is available because of the following reason. In the situation in which the cutting off of a connection is determined, it is possible to think of a state in which it is no more possible to secure a physical wireless link due to an increase in the communication distance from the communication partner STA thereby leading to not being able to receive nor decode the wireless signals. That is, the reception of a release frame cannot be expected.

As a specific example of determining the cutting off of a connection according to an implicit method, a timer is used. For example, in the case of transmitting a data frame that requests for a transmission confirmation response frame, a first timer for limiting the retransmission period of the concerned data frame (for example, a retransmission timer for data frames) is activated, and retransmission is performed if a transmission confirmation response frame with respect to the concerned data frame is not received until the first timer lapses (that is, until the desired retransmission period elapses). When a transmission confirmation response frame with respect to the concerned frame is received, the first timer is stopped.

However, if the first timer lapses without the reception of a transmission confirmation response frame; for example, a management frame is transmitted to check whether the communication partner STA is still present (within the communication range) (in other words, whether the wireless link is still secured), and at the same time a second timer for limiting the retransmission period of the concerned management frame (for example, a retransmission timer for management frames) is activated. In an identical manner to the case of the first timer, regarding the second timer too, the retransmission is performed if a transmission confirmation response frame with respect to the concerned management frame is not received until the second timer lapses. When the second timer lapses, it is determined that the connection is cut off.

Alternatively, a third timer is activated when a frame is received from the communication partner STA and, every time a frame is received from a new communication partner STA, the third timer is stopped and activated from the initial value. When the third timer lapses, in an identical manner to the explanation given earlier, a management frame is transmitted to check whether the communication partner STA is still present (within the communication range) (in other words, whether the wireless link is still secured), and at the same time the second timer for limiting the retransmission period of the concerned management frame (for example, the retransmission timer for management frames) is activated.

In this case too, the retransmission is performed if a transmission confirmation response frame with respect to the concerned management frame is not received until the second timer lapses. When the second timer lapses, it is determined that the connection is cut off. Meanwhile, the management frame used in the latter case for checking whether the communication partner STA is still present can be different than the management frame used in the former case. Moreover, the timer for limiting the retransmission period of the concerned management frame in the latter case is same as the second timer used in the former case. However, alternatively, a different timer can be used.

Given below is the explanation of a method for accessing the wireless LAN system. For example, a wireless LAN system is present in which, for example, communication or competition with a plurality of STAs is assumed. In the IEEE 802.11 wireless LAN (including the extended standard), CSMA/CA represents the basis for the accessing method. In the method in which a plurality of STAs assesses the transmission of a particular STA and performs transmission after letting a fixed period of time pass since the end of the concerned transmission, as a result of simultaneous transmission from a plurality of STAs that assessed the transmission of the particular STA, there occurs collision of wireless signals and a failure in frame transmission. However, if a plurality of STAs assesses the transmission of a particular STA and refrains from performing transmission for random periods of time following the end of the concerned transmission, then the transmission from those STAs becomes stochastically scattered.

Hence, if there is only one STA that waited for the shortest period of time from among the random periods of time, then the frame transmission becomes successful and collision of frames can be avoided. Since the transmission rights can be won fairly and impartially by a plurality of STAs based on the random values, it can be said that the method implementing carrier avoidance is suitable for sharing the wireless medium among a plurality of STAs.

Given below is the explanation of the frame intervals in a wireless LAN. Herein, the explanation is given about the frame intervals in the IEEE 802.11 wireless LAN. In the IEEE 802.11 wireless LAN, the following six types of frame intervals are used: distributed coordination function interframe space (DIFS); arbitration interframe space (AIFS); point coordination function interframe space (PIFS); short interframe space (SIFS); extended interframe space (EIFS); and reduced interframe space (RIFS).

In the IEEE 802.11 wireless LAN, a frame interval is defined as a continuous period of time that should be provided upon confirming carrier sense idle before transmission, and a precise period of time since the previous frame is not discussed. Thus, in this explanation about the IEEE 802.11 wireless LAN system, that definition is followed. In the IEEE 802.11 wireless LAN, the period of waiting at the time of random accessing based on CSMA/CA is assumed to be the sum of a fixed period of time and a random period of time, and it can be said that such definition is given for making clear the fixed period of time.

The DIFS and the AIFS represent frame intervals used at the time of attempting to start the frame exchange during a contention period for competing with other STAs based on CSMA/CA. The DIFS is used when there is no distinction in the priority according to the traffic type, while the AIFS is used when priority is set according to the traffic type (traffic identifier: TID).

Since the operations according to the DIFS are similar to the operations according to the AIFS, the following explanation is mainly given with reference to the AIFS. In the IEEE 802.11 wireless LAN, access control is performed that includes the start of frame exchanging in the MAC layer. Moreover, in the case of providing the quality of service (QoS) when data is transferred from a higher layer, the traffic type is notified along with the data and the access-time class of priority of the data is set according to the traffic type. The access-type class is called access category (AC). Thus, for each access category, the AIFS value is set.

The PIFS represents a frame interval for enabling an access having priority over other competing STAs, and has a shorter period of time than the DIFS as well as the AIFS. The SIFS represents a frame interval that can be used in the case of transmission of a response-type control frame or in the case of continuing with frame exchanging according to burst transmission once the access rights are won. It can be said that the SIFS represents the shortest frame interval in the case in which a transceiving switching period is requested. The EIFS represents the frame interval implemented when the frame reception fails. The RIFS represents a frame interval that can be used in the case of successively transmitting a plurality of frames to the same STA according to burst transmission once the access rights are won; and no response frame is requested from the destination STA while the RIFS is being used. It can be said that the RIFS represents the shortest frame interval in the case in which a transceiving switching period is not requested.

Figure 10:
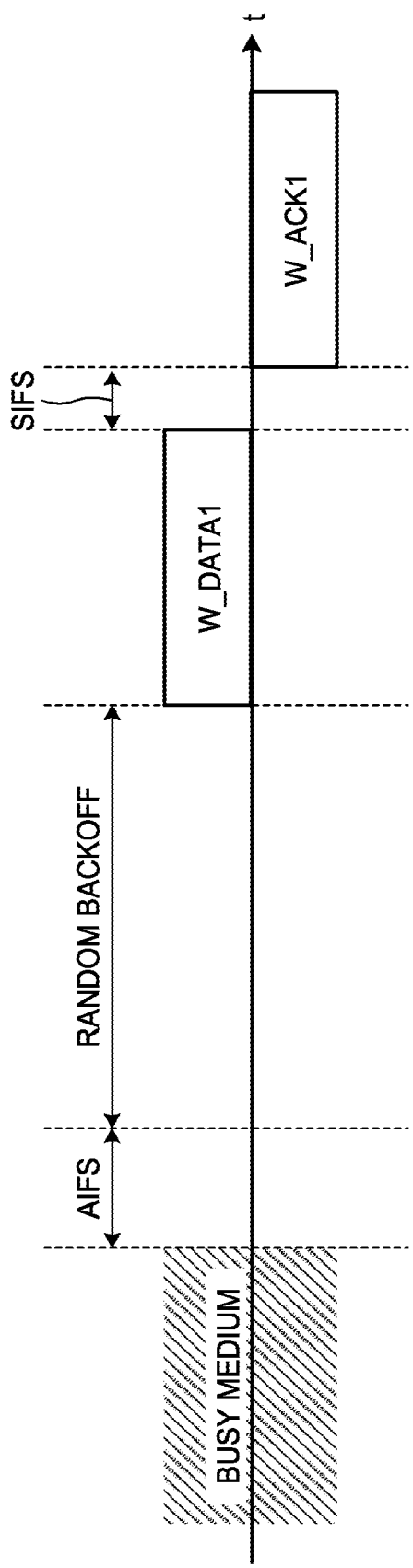
FIG. 10 is a diagram illustrating an example of frame exchanging between contention periods based on random accessing in an IEEE 802.11 wireless LAN.

In FIG. 10 is illustrated an example of frame exchanging between contention periods based on random accessing in the IEEE 802.11 wireless LAN. Consider a case in which a transmission request for transmitting a data frame (W_DATA1) is issued in a particular STA, but the result of carrier sense indicates that the medium is recognized to be busy (busy medium). In that case, the AIFS is provided for a fixed period of time from the point of time at which the carrier sense becomes idle, and the data frame W_DATA1 is transmitted to the communication partner after the passage of a random period of time (random backoff).

The random period of time is obtained by multiplying a slot period by a pseudorandom integer that is derived from the uniform distribution between the contention window (CW) provided from zero by an integer. Herein, the result of multiplying the slot period by CWs is called a CW time length. Herein, CWmin represents the initial value of CW and, every time transmission is performed, the CW value is incremented until it becomes equal to CWmax. Moreover, CWmin as well as CWmax holds the value for each access category in an identical manner to the AIFS. In the destination STA for the data frame W_DATA1, when the data frame is successfully received, a response frame (W_ACK1) is transmitted after the SIFS since the point of time of end of the reception. Upon receiving the response frame W_ACK1, within the transmission burst timing limit, the STA that transmitted the data frame W_DATA1 can transmit the next data frame (for example, W_DATA2) again after the SIFS.

The AIFS, the DIFS, the PIFS, and the EIFS represent functions of the SIFS and the slot period. However, the SIFS and the slot period are defined for each physical layer. Moreover, the parameters such as the AIFS, CWmin, and CWmax that are set for each access category can be set for each communication group (in the IEEE 802.11 wireless LAN, the basic service set (BSS)), and the default values thereof are fixed.

For example, in the formulation of the 802.11ac standard, it is assumed that the SIFS is equal to 16 μs and the slot period is equal to 9 μs. Accordingly, it is assumed that: the PIFS is equal to 25 μs; the DIFS is equal to 34 μs; in the AIFS, the frame interval of the access category BACKGROUND (AC_BK) has the default value of 79 μs; in the AIFS, the frame interval of the access category BEST EFFORT (AC_BE) has the default value of 43 μs; in the AIFS, the frame interval of the access categories VIDEO (AC_V1) and VOICE (AC_V0) have the default value of 34 μs; in the access category BACKGROUND (AC_BK) and the access category BEST EFFORT (AC_BE), CWmin has the default value of 31 and CWmax has the default value of 1023; in the access category VIDEO (AC_V1), CWmin has the default value of 15 and CWmax has the default value of 31; and in the access category VOICE (AC_V0), CWmin has the default value of 7 and CWmax has the default value of 15.

The EIFS represents the sum of the SIFS, the DIFS, and the time length of a response frame in the case of performing transmission at the lowest mandatory physical rate; or represents the sum of the SIFS, the DIFS, and, if the time length of response frame can be estimated from the physical packet that activated the EIFS, the estimated time length. Herein, a wireless communication system in which parameters of such frame intervals are used is assumed to be an interference system having a wide communication range. Moreover, the frames written herein can also include null data packets that do not have the configuration of a MAC frame and that include signals only in the physical layer. Other than the null data packets, the physical packets include the MAC frames as a payload.

In this way, in the mobile communication device according to the embodiment, if the determining unit determines that a frame received by the receiver is a frame transmitted in tandem with the operations of the imaging target, the clock timing is corrected based on the first position information, the second position information, the third position information, the first timing, the second timing, the third timing, and the fourth timing. As a result, it becomes possible to correctly synchronize the mobile communication device and the roadside communication device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is installed in a mover and that operates in synchronization with a clock, the communication device comprising:
   a receiver configured to receive a frame including
      a first timing that indicates timing at which an imaging target performs operation in such a way that there is a difference among taken images taken for a plurality of times,
      a second timing that indicates timing at which the first timing becomes transmittable, and
      first position information that indicates a position of installation of the imaging target;
   an imager configured to capture the imaging target for a plurality of times;
   a detector configured to detect
      second position information that indicates a position of the imager when the imager captures the imaging target which performs operation in such a way that there is a difference among the taken images, and
      third position information that indicates a position of the imager when the receiver receives the frame;
   a determiner configured to
      based on a third timing that indicates a timing at which the imager captures the imaging target which performs operation in such a way that there is a difference among the taken images,
      based on a fourth timing that indicates a timing at which the receiver receives the frame,
      based on the first timing, and
      based on the second timing,
   determine whether or not the frame received by the receiver is a frame transmitted in tandem with operation performed by the imaging target; and
   a corrector configured to, when the determiner determines that the frame received by the receiver is a frame transmitted in tandem with operation performed by the imaging target, correct a timing of the clock based on the first position information, the second position information, the third position information, the first timing, the second timing, the third timing, and the fourth timing.

2. The communication device according to claim 1, wherein
   the receiver receives the frame further including type information that indicates a frame type, and
   based on the type information, the determiner determines whether or not the frame received by the receiver is a frame transmitted in tandem with an operation performed by the imaging target.

3. The communication device according to claim 1, wherein, if Δt1 represents a difference between the third timing and the first timing and if Δt2 represents a difference between the fourth timing and the second timing, and when a difference between Δt1 and Δt2 is equal to or smaller than a predetermined threshold value, the determiner determines that the frame received by the receiver is a frame transmitted in tandem with operation performed by the imaging target.

4. The communication device according to claim 1, wherein
   the receiver receives the frame further including delay information that indicates a delay equivalent to a difference between the second timing and the first timing, and
   based on the delay information, the determiner determines whether or not the frame received by the receiver is a frame transmitted in tandem with operation performed by the imaging target.

5. The communication device according to claim 1, further comprising a controller configured to
   when time interval at which the determiner obtains the third timing exceeds a predetermined threshold value, perform control to make the determiner to stop performing determination, and
   when the determiner newly obtains the third timing, perform control to make the determiner to resume performing determination.

6. The communication device according to claim 1, wherein the frame is a management frame transmitted by an access point.

7. The communication device according to claim 1, wherein the frame is a beacon frame transmitted by an access point.

8. The communication device according to claim 1, wherein the frame includes operation information indicating that an imaging target performs operation in such a way that there is a difference among the taken images taken for a plurality of times.

9. A communication method comprising:
  receiving a frame including
    a first timing that indicates timing at which an imaging target performs operation in such a way that there is a difference among taken images taken for a plurality of times,
    a second timing that indicates timing at which the first timing becomes transmittable, and
    first position information that indicates a position of installation of the imaging target;
  capturing the imaging target for a plurality of times in the receiving;
  detecting
    second position information that indicates a position of an imager when the imager captures the imaging target which performs operation in such a way that there is a difference among the taken images, and
    third position information that indicates a position of the imager when the frame is received in the detecting;
  determining
    based on a third timing that indicates a timing at which the imager captures the imaging target which performs operation in such a way that there is a difference among the taken images,
    based on a fourth timing that indicates a timing at which the frame is received,
    based on the first timing, and
    based on the second timing,
    whether or not the received frame is a frame transmitted in tandem with operation performed by the imaging target in the determining; and
  correcting, when the determining determines that the received frame is a frame transmitted in tandem with operation performed by the imaging target, a timing of the clock based on the first position information, the second position information, the third position information, the first timing, the second timing, the third timing, and the fourth timing in correcting process.

10. The communication method according to claim 9, wherein
  the frame further includes type information that indicates a frame type, and
  based on the type information, the determining determines whether or not the received frame is a frame transmitted in tandem with an operation performed by the imaging target.

11. The communication method according to claim 9, wherein, if Δt1 represents a difference between the third timing and the first timing and if Δt2 represents a difference between the fourth timing and the second timing, and when a difference between Δt1 and Δt2 is equal to or smaller than a predetermined threshold value, the determining determines that the received frame is a frame transmitted in tandem with operation performed by the imaging target.

12. The communication method according to claim 9, wherein
  the frame further includes delay information that indicates a delay equivalent to a difference between the second timing and the first timing, and
  based on the delay information, the determining determines whether or not the received frame is a frame transmitted in tandem with operation performed by the imaging target.

13. The communication method according to claim 9, further comprising
  when time interval at which the determining obtains the third timing exceeds a predetermined threshold value, performing control to stop performing determination, and
  when the determining newly obtains the third timing, performing control to resume performing determination.

14. The communication method according to claim 9, wherein the frame is a management frame transmitted by an access point.

15. The communication method according to claim 9, wherein the frame is a beacon frame transmitted by an access point.

16. The communication method according to claim 9, wherein the frame includes operation information indicating that an imaging target performs operation in such a way that there is a difference among the taken images taken for a plurality of times.

* * * * *

UNITED STATES PATENT AND TRADEMARK OFFICE
CERTIFICATE OF CORRECTION

PATENT NO. : 10,306,572 B2  
APPLICATION NO. : 15/391266  
DATED : May 28, 2019  
INVENTOR(S) : Tomoko Adachi Page 1 of 1

It is certified that error appears in the above-identified patent and that said Letters Patent is hereby corrected as shown below:

On the Title Page

Item (30), should read:  
-- Mar. 16, 2016 (JP) ............................2016-052982 --

Signed and Sealed this  
Twenty-eighth Day of April, 2020

Andrei Iancu  
*Director of the United States Patent and Trademark Office*